(12) United States Patent
McCaskill et al.

(10) Patent No.: US 12,413,010 B2
(45) Date of Patent: Sep. 9, 2025

(54) DEVICE FOR SUPPLYING A CONSUMER

(71) Applicant: igus GmbH, Cologne (DE)

(72) Inventors: Sean McCaskill, Charlotte, NC (US);
Robb Duff, Ruppichteroth (DE);
Martin Tiling, Cologne (DE)

(73) Assignee: igu, Cologne (DE)

( * ) Notice: Subject to any disclaimer, the term of this patent is extended or adjusted under 35 U.S.C. 154(b) by 0 days.

(21) Appl. No.: 18/745,186

(22) Filed: Jun. 17, 2024

(65) Prior Publication Data

US 2024/0339781 A1    Oct. 10, 2024

Related U.S. Application Data

(63) Continuation of application No. 17/606,561, filed as application No. PCT/EP2020/061272 on Apr. 23, 2020, now Pat. No. 12,015,223.

(30) Foreign Application Priority Data

Apr. 26, 2019   (DE) .................... 20 2019 102 347.3

(51) Int. Cl.
*H01R 13/447*   (2006.01)
*B63J 3/04*   (2006.01)
*H01R 13/53*   (2006.01)

(52) U.S. Cl.
CPC ............... *H01R 13/53* (2013.01); *B63J 3/04* (2013.01); *H01R 13/447* (2013.01); *B63J 2003/043* (2013.01)

(58) Field of Classification Search
None
See application file for complete search history.

(56) References Cited

U.S. PATENT DOCUMENTS

| 5,306,999 A | 4/1994 | Hoffman |
| 5,385,480 A | 1/1995 | Hoffman |

(Continued)

FOREIGN PATENT DOCUMENTS

| AU | 2012222476 B2 | 9/2013 |
| CN | 103442981 A | 12/2013 |

(Continued)

OTHER PUBLICATIONS

European Patent Office, International Search Report in PCT App. No. PCT/EP2020/061272, Oct. 29, 2020, pp. 1-4.

(Continued)

*Primary Examiner* — Tho D Ta
(74) *Attorney, Agent, or Firm* — Cahn & Samuels, LLP

(57) ABSTRACT

A device (1) is configured to supply a consumer, the position of which initially cannot be exactly determined but later can be substantially stationarily fixed, with energy from a stationary supplier. The device includes a movable carriage or slide (2) connected to an arm (3). The arm (3) is movable between first and second positions (7, 8) and includes at least one plug part (4) for connection to a consumer's energy supply line (5). The plug part (4) is connected to the supplier with an energy supply line (6). A cover part (9), which is movable with the movement of the arm, is arranged on the arm (3). In the arm's first position (7), the cover part at least partially covers the plug part (4), and in the arm's second position (8), the cover part exposes the plug part (4) for connection to the consumer's energy supply line (5).

19 Claims, 3 Drawing Sheets

(56) References Cited

U.S. PATENT DOCUMENTS

Figure 1:
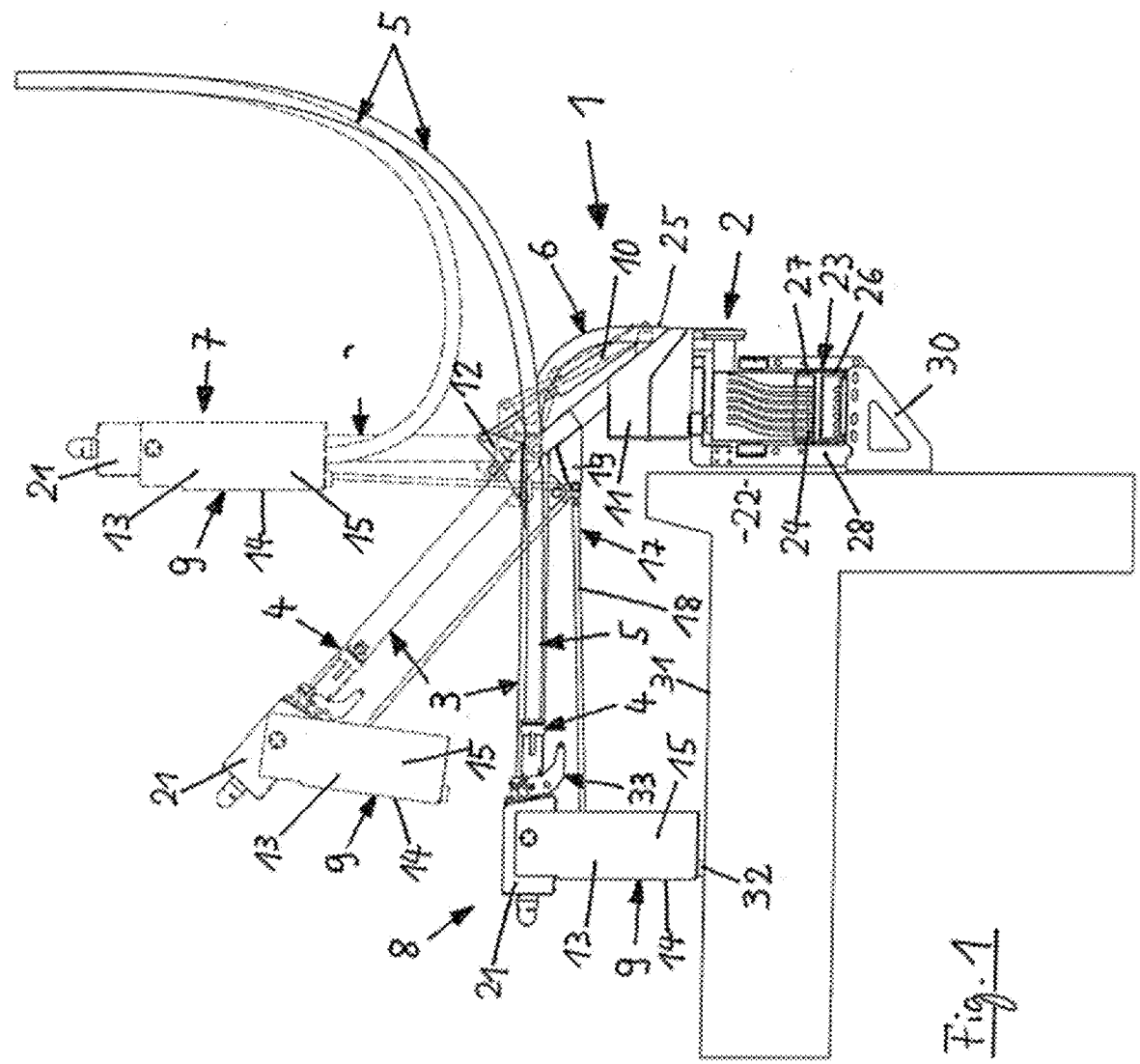

| | | | | |
|---|---|---|---|---|
| 12,015,223 | B2* | 6/2024 | McCaskill | H01R 13/447 |
| 2013/0341144 | A1 | 12/2013 | Greenberg et al. | |
| 2016/0332525 | A1 | 11/2016 | Kufner et al. | |
| 2022/0231450 | A1 | 7/2022 | McCaskill et al. | |

FOREIGN PATENT DOCUMENTS

| | | |
|---|---|---|
| CN | 106132761 A | 11/2016 |
| CN | 106394851 A | 2/2017 |
| CN | 108367689 A | 8/2018 |
| DE | 102009006982 A1 | 8/2009 |
| EP | 3408131 B1 | 12/2019 |
| JP | 2015182838 A | 10/2015 |
| KR | 1020130128001 | 11/2013 |
| KR | 101693151 B1 | 1/2017 |
| WO | 2011104422 A1 | 9/2011 |
| WO | 2012116919 A1 | 9/2012 |
| WO | 2015104080 A1 | 7/2015 |
| WO | 2017129572 A1 | 8/2017 |

OTHER PUBLICATIONS

European Patent Office, Written Opinion in PCT App. No. PCT/EP2020/061272, Oct. 29, 2020, pp. 1-5.
European Patent Office, English abstract for DE10 2009 006 982 A1, printed on Oct. 8, 2021.
The International Bureau of WIPO, English translation of the International Preliminary Report on Patentability for PCT App. No. PCT/EP2020/061272, Sep. 28, 2021, pp. 1-6.
Deutsches Patent- und Markenamt, search report in App. No. DE 20 2019 102 347.3, Mar. 16, 2022, pp. 2-4.
Deutsches Patent- und Markenamt, citation page for Igus Asean, "e-chain reel for Shore power," https://www.youtube.com/watch?v=NZ_kTMxn_zs, retrieved Mar. 20, 2019 by Deutsches Patent- und Markenamt, p. 1.
Igus Asean, "e-chain reel for Shore power,", 0:18 second mark, https://www.youtube.com/watch?v=NZ_kTMxn_zs, printed on Apr. 6, 2022, p. 1.
Igus Asean, "e-chain reel for Shore power,", 0:23 second mark, https://www.youtube.com/watch?v=NZ_kTMxn_zs, printed on Apr. 6, 2022, p. 1.
Stoller, Detlef "Siemens baut im Hamburger Hafen Landstromanschlouss fuer Kreuzfahrtschiffe", https://www.ingenieur.de/technik/fachbereiche/umwelt/siemens-baut-im-hamburger-hafen-landstromanschluss-fuer-kreuzfahrtschiffe/, retrieved on Mar. 2, 2022 by Deutsches Patent- und Markenamt.
IP Australia, Examination Report No. 1 for standard patent application in AU App. No. 2020262162, Aug. 28, 2023, pp. 1-4.
Intellectual Property Office of Singapore, Written Opinion for SG App. No. 11202111586X, Oct. 5, 2023, pp. 1-6.
Korean Intellectual Property Office, Notice of Preliminary Rejection for KR App. No. 10-2021-7038427, Oct. 22, 2023, pp. 1-5.
The State Intellectual Property Office of People's Republic of China, First Office Action for CN 202080037619.3, Jan. 10, 2024, pp. 1-6.
The State Intellectual Property Office of People's Republic of China, search report for CN 202080037619.3, Jan. 10, 2024, pp. 1-2.
European Patent Office, English abstract for CN106394851A, retrieved Feb. 5, 2024.
European Patent Office, English abstract for KR101693151B1, retrieved Feb. 5, 2024.
European Patent Office, English abstract for CN103442981A, retrieved Feb. 5, 2024.
European Patent Office, English abstract for JP2015182838, retrieved Feb. 5, 2024.
European Patent Office, English abstract for CN106132761, retrieved Feb. 5, 2024.
European Patent Office, English abstract for CN108367689, retrieved Feb. 5, 2024.

* cited by examiner

DEVICE FOR SUPPLYING A CONSUMER

The invention concerns a device for supplying a consumer, the position of which initially cannot be exactly determined but which can later be substantially stationarily fixed, with power from a stationary supplier, comprising a displaceable carriage or slide connected to an arm which is moveable between a first position and a second position and which has at least one plug part for connection to a power supply line to the consumer, wherein the plug part is connected to the supplier by way of a power supply line.

Such a device is known from WO 2012/116919 A1. That device involves a power supply device for a ship berthing dock of a port. The guide device has a land-mounted horizontally displaceable carriage, at which there is arranged a power supply line provided with a plug part for supplying the ship with electrical power. In that case the power supply line can be electrically connected to a power supply grid on the land. Arranged on the carriage is a plug-side portion of the power supply line, being displaceable vertically by way of an arm.

With the horizontally displaceable carriage or slide, the portion of the power supply line that is provided with the plug part can be arranged variably, for example along the ship berthing dock and also along a ship at the dock. In that way the portion of the power supply line, that is provided with the plug part, can be displaced to the location of the ship berthing dock at which it is required for the respective ship there. That is advantageous in particular because the most widely varying ships can dock at a ship berthing dock, differing for example by their size and their construction. In the case of each of those ships, the power supply line which is provided with the plug part and which leads from the consumer can be required at another location along the ship berthing dock. By virtue of the slide which is displaceable on a suitable guide device which can also accommodate the supplier-side portion of the power supply line, that arrangement avoids the supplier-side portion of the power supply line lying loosely and unprotected over long distances on or at the ship berthing dock.

The connection of the plug part connected to the power supply line of the supplier, to the power supply line of the consumer, by virtue of the applied high voltage, involves the risk of an arc ignition and an explosion caused thereby, by virtue of which hot gases can issue into a space which is being used by people and/or which contains flammable articles. In particular such an arc explosion can endanger people working on a quay installation of a ship berthing dock and flammable articles like vehicles.

Therefore the object of the present invention is to provide a device for supplying a consumer of the above-indicated kind, which substantially protects a space which is endangered in relation to people and flammable articles from the effects of a possible arc ignition between the plug part of the supplier-side power supply line and the consumer-side power supply line that is connected to the plug part.

According to the invention that object is attained in that arranged on the moveable arm connected to the displaceable carriage or slide is a cover part which is moveable with the movement of the arm and which in the first position of the arm at least partially covers the plug part and in the second position of the arm exposes the plug part for connection to the consumer-side power supply line.

By virtue of the cover part which is coupled in its movement to the movement of the arm it is possible to shield an endangered area, for example on a quay installation of a ship berthing dock, in relation to possible arc ignition of the connection between the plug part and the consumer-side power supply line.

In the first position of the arm, the arm can be in a readiness position in which the plug part is not connected to a consumer-side power supply line. The carriage or slide can be displaced with that position of the arm to the location at which the consumer is disposed and the consumer-side power supply line can be passed to the device for supplying the consumer. The arm connected to the carriage or slide can be moved out of that first position into its second position in which the cover part exposes the plug part, whereupon the consumer-side power supply line can be connected to the plug part. After the connection of the consumer-side power supply line to the plug part, the arm with the consumer-side power supply line can be moved out of its second position into the first position in which the cover part at least partially covers the plug part. In that situation the arm is then in its readiness position in which the consumer can be supplied with power from the stationary supplier.

The cover part can be so arranged on the arm in its first position that it covers the plug part in the direction facing away from the consumer and preferably also in the two directions of the path of travel of the carriage or slide.

Preferably in its second position the arm is so arranged that the plug part is easily accessible to an operator disposed on a stationary base surface, relative to which the carriage or slide is displaceable, so that it can easily connect to the plug part in particular a consumer-side power supply line which is of relatively great weight and thickness.

The cover part can have a wall which is directed away from the consumer and with which it covers the plug part in the first position of the arm. In addition the cover part can have side walls which adjoin its wall facing away from the consumer and which face in the direction of the path of travel of the carriage or slide and which together with the wall facing away from the consumer cover the plug part in the first position of the arm.

The plug part can be locked to the arm in the first position thereof.

The movement of the cover part can be coupled to the movement of the arm between its first and second positions, in particular by a mechanical coupling between the cover part and the arm.

In a preferred embodiment of the invention, the arm is pivotable between its first position and its second position, wherein the pivot axis can be arranged horizontally and parallel to the path of travel of the carriage or slide.

The carriage or slide can be arranged in a shaft in the stationary base surface, for example of a quay, so that the arm connected to the carriage or slide, in its second position, can be arranged substantially horizontally, but at least at an angle of less than 30°, in particular less than 20°, with respect to the horizontal, so that the plug part can be easily reached by an operator.

If the construction involves a power supply device for a ship at a ship berthing dock of a port, the carriage or slide is preferably arranged in a guide device which is mounted at the ship side to the quay wall so that the arm connected to the carriage or slide, in its second position, can also be arranged substantially horizontally but at least at an angle of less than 30°, in particularly less than 20°, with respect to the horizontal, at a height above the quay that can be easily reached by an operator.

In its first position the arm can be pivoted up out of its second position so that the plug part is arranged higher than in the second position of the arm. In its first position, the arm can be arranged at an angle greater than 60°, in particularly greater than 70°, with respect to the horizontal. In that position the carriage or slide together with the arm occupies a relatively small space extending horizontally and perpendicularly to the path of travel of the carriage or slide. Therefore the carriage or slide together with the arm in its first position occupies on the stationary base surface, for example a quay, a relatively small space which scarcely limits the freedom of movement of vehicles and people there.

In a preferred embodiment of the invention, the cover part can be in the form of a flap pivotable on the arm about an axis parallel to the pivot axis of the arm, wherein the axis is arranged at a spacing from the plug part in a direction towards the free end of the arm.

In a preferably approximately vertical position of the arm in its first position, the flap can also be in a vertical pivotal position. The wall facing away from the consumer and the side walls of the flap, that face in the direction of the travel of the carriage or slide can then also extend vertically.

By the pivotal movement of the flap being coupled to the pivotal movement of the arm, the flap, in the pivotal movement of the arm, can be pivoted out of its first position into the second position away from the arm so that the plug part is exposed in the second position of the arm. The flap can also be in a vertical position with the arm in its second position.

The arm and the flap can be of such a structure that the flap, in the second position of the arm, in which it is pivoted away from the arm, is supported on a stationary base surface, for example the quay of a ship berthing dock.

The flap can have a wall which preferably faces substantially at a right angle away from the consumer and side walls which laterally adjoin same and which face in the direction of the travel of the carriage or slide, preferably being substantially rectangular. The flap can then protect an endangered space away from the consumer and laterally from the effects of an arc explosion in the connecting region between the plug part and the consumer-side power supply line. When using the device according to the invention for power supply for a ship which is berthed at a quay in a port, with this configuration for the flap, the arrangement provides protection perpendicularly to the path of travel of the carriage or slide towards the quay and in both directions of the path of travel.

The wall facing away from the consumer and optionally the side walls of the flap can be arranged substantially perpendicularly to the arm in the second position of the latter.

The flap can be coupled to the arm by a lever mechanism in such a way that it is simultaneously also pivoted by the pivotal movement of the arm between its first and second positions.

For that purpose the lever mechanism can have a link rod which is arranged in one of its end regions pivotably to the flap and in its other end region pivotably to a lever arm which is connected stationarily to the carriage or slide and which faces away from the consumer.

Arranged on or in the arm there can be a cable passage which extends along the arm and in which the at least one power supply line is arranged in the region of the arm.

The arm can be of a plate-shaped configuration, with the cable passage being arranged on the arm.

In particular a respective cable passage can be arranged in the region of one of the two longitudinal sides of the arm.

The cable passage can be of a flexurally flexible configuration at least in the region of the pivotal connection of the arm to the carriage or slide in the pivotal direction.

In the region of the free end of the arm there can be a housing into which the supplier-side power supply line is passed and guided to a plug part which projects at the housing in the direction towards the consumer. The cable passage can end at the housing.

The cover part can terminate in the first position of the arm with the housing at the side directed away from the consumer, the sides facing in the direction of the path of travel of the carriage or slide and the side facing away from the carriage or slide, with the housing. In that way the cover part with the housing in the first position of the arm forms a substantially closed cover for the plug part in the direction facing away from the consumer and in the lateral direction of the path of travel of the carriage or slide and in the direction of the arm, that faces away from the carriage or slide. Hot gases which occur by virtue of arc ignition can thus be diverted into an unendangered space.

The cover part in the form of the flap can be mounted pivotably to the housing.

The supplier-side power supply line can be laid in a region between the stationary supplier and the carriage or slide in at least one energy guide chain which has a first connection arranged stationarily relative to the supplier and a second connection which is arranged at the carriage or slide and from which the power supply line is passed to the pivotable arm by way of at least one cable passage.

The energy guide chain can have a first run connected to the first connection and a second run connected to the second connection, the runs being connected together by way of a direction-changing region. The two runs can be arranged in mutually superposed relationship, with the lower run preferably being connected to the first connection and the upper run preferably being connected to the second connection.

The energy guide chain can be arranged in an in particular channel-shaped guide device. The guide device with the energy guide chain, when using the device according to the invention for a ship lying at a quay in a port, can be arranged at the side of the quay wall which faces towards the ship.

Alternatively the guide device with the energy guide chain can also be arranged in a shaft provided in a stationary base, relative to which the carriage or slide is displaceable, for example a quay installation of a port. The guide device can also be arranged on the stationary base, for example a quay installation of a port.

Figure 2:
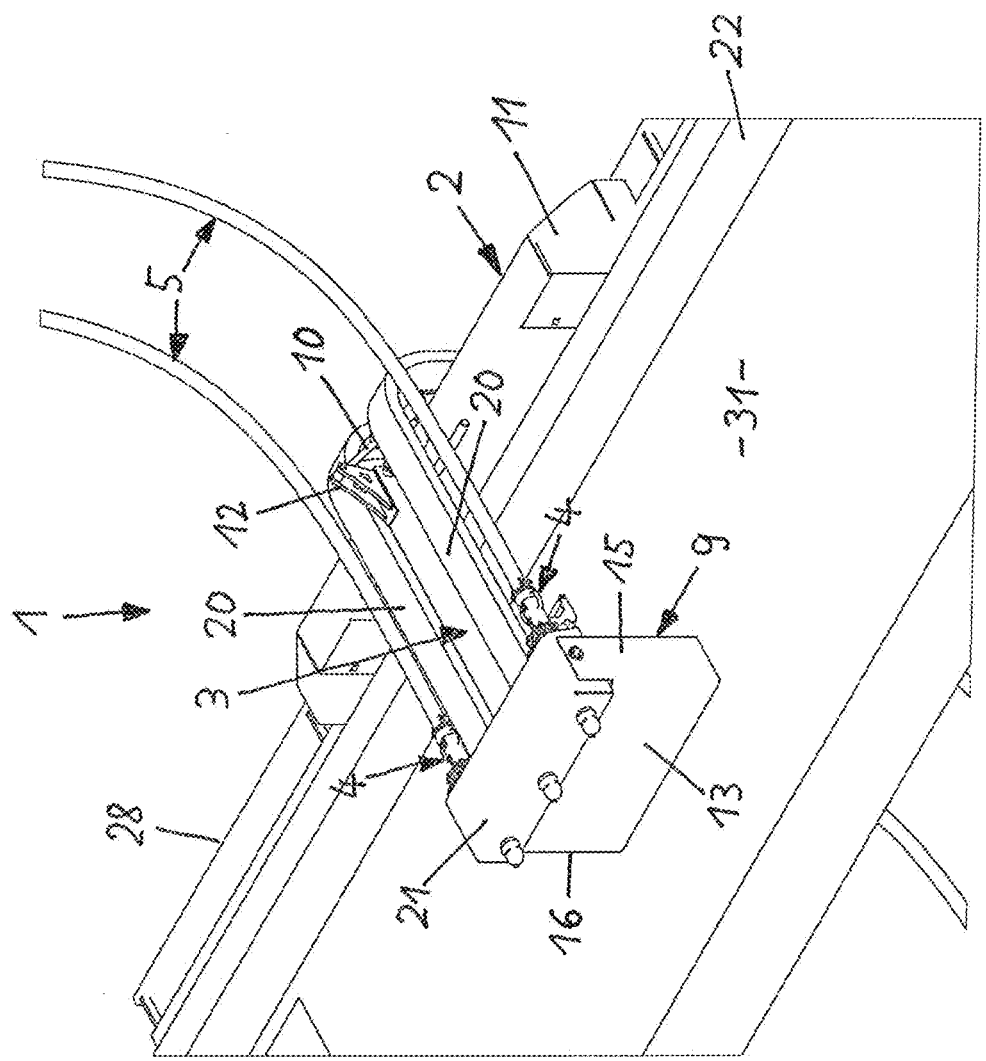
Figure 3:
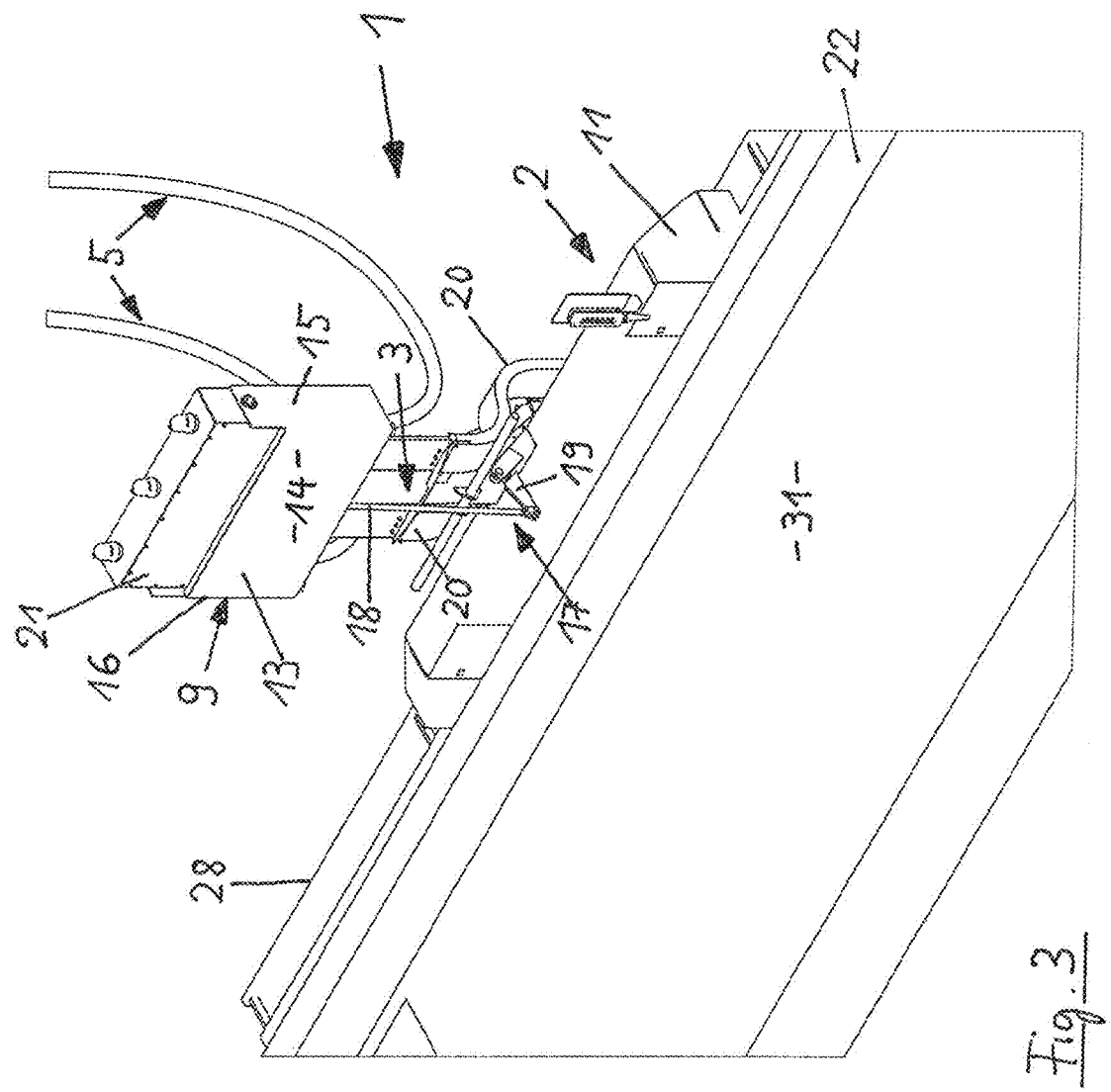

An embodiment of the present invention is described in greater detail hereinafter with reference to the drawing in which:

FIG. 1 shows an end view of a device for supplying a consumer, wherein the arm with the plug part, that is connected to the carriage or slide, is disposed in its second position, with its first position shown in broken line, and an intermediate position, FIG. 2 shows a perspective view of the device for supplying a consumer as shown in FIG. 1, wherein the arm connected to the carriage or slide is in its second position, and FIG. 3 shows a perspective view of the device for supplying a consumer as shown in FIG. 1, wherein the arm connected to the carriage or slide is in its first position.

As can be seen from the drawing the device 1 for supplying a consumer or load (not shown in the drawing), the position of which initially cannot be exactly determined but can later be substantially stationarily fixed includes a displaceable carriage or slide 2 connected to a pivotable arm 3. The arm has at least one plug part 4 for connection to a power supply line 5 of the consumer, wherein the plug part 4 is connected by way of a power supply line 6 to the stationary supplier (not shown in the drawing).

As can be seen in particular from FIG. 1, the arm connected to the carriage or slide 2 is pivotable between a first position 7 and a second position 8. Arranged on the arm 3 in the region of its free end is a cover part 9 which is pivotable with the pivotal movement of the arm 3 and the pivotal movement of which is coupled to the pivotal movement of the arm 3, more specifically in such a way that the cover part 9, in the first position 7 of the arm 3, at least partially covers the plug part 4, while in the second position 8 of the arm 3, the cover part 9 exposes the plug part 4 for connection to the consumer-side power supply line 5.

The carriage or slide 2 is displaceable perpendicularly to the plane of the drawing in FIG. 1 in both directions. The axis about which the arm 3 connected to the carriage or slide 2 is pivotable is arranged parallel to the path of travel of the carriage or slide 2. As can also be seen from the drawing, the arm 3, in its first position 7, is arranged substantially vertically while in its second position 8, it is arranged substantially horizontally.

In the intermediate position of the pivotable arm 3 as shown in FIG. 1 the consumer-side power supply line 5 is not shown for the sake of clarity of the drawing.

In the embodiment being considered here, the arm 3 is pivotable by way of a hydraulic drive 10 which hingedly engages a hood-shaped cover 11 of the carriage or slide 2 and a forked leg 12 which is arranged on the arm 3 at its end region opposite to the free end.

The cover part 9 is in the form of a flap 13 which is pivotable on the arm 3 about an axis parallel to the pivot axis of the arm 3, wherein the axis is arranged at a spacing from the plug part 4 in a direction towards the free end of the arm 3. As can be seen from the drawing, the flap 13 has a substantially rectangular wall 14 facing away from the consumer and substantially rectangular side walls 15, 16 adjoining the wall 14 and facing in the direction of the path of travel of the carriage or slide 2. The flap can thus protect an endangered region in space which, as shown in the drawing, is a quay installation for a ship (consumer) to be docked there, away from the consumer and laterally, from the effects of a possible arc explosion in the connecting region between the plug part 4 and the consumer-side power supply line 5.

In the vertical position of the arm 3 in its first position, the flap 13 is also in its vertical pivotal position, wherein the wall 14 facing away from the consumer and the side surfaces 15, 16 of the flap 13, that face in the direction of the path of travel of the carriage or slide 2, also extend vertically. As can be seen in particular from FIG. 1, the flap 13 is coupled to the arm 3 by a lever mechanism 17 in such a way that it is also simultaneously pivoted by the pivotal movement of the arm 3 between its first position 7 and its second position 8. The lever mechanism 17 has a link rod 18 which is arranged in one of its end regions pivotably to the flap 13 and in its other end region pivotably to a lever arm 19 which is stationarily connected to the carriage or slide 2 and which faces away from the consumer.

As in particular FIGS. 2 and 3 show the arm 3 is of a plate-shaped configuration, wherein a respective cable passage 20 is disposed in the region of one of the two longitudinal sides of the plate-shaped arm 3, in which there is respectively arranged a region of the power supply line 6, towards the arm.

As can be seen in particular from FIGS. 2 and 3, the two cable passages 20 are of a flexurally flexible configuration in the pivotal direction of the arm 3.

Arranged in the region of the free end of the arm 3 is a housing 21 in which the cable passages 20 end and the region, arranged therein, of the power supply line 6 are guided to the plug part 4 projecting on the housing 21 in the direction towards the consumer.

The flap 13 is mounted pivotably to the housing 21. As shown in FIG. 3, the flap 13 terminates in the first position 7 of the arm 3 with the housing 21 at the side directed away from the consumer, the sides facing in the direction of the path of travel of the carriage or slide 2 and the side facing away from the carriage or slide 2, with the housing 21 without noticeable intermediate spaces occurring between the flap 13 and the housing 21 at those sides, through which hot gases occurring in the event of possible arc ignition being able to escape in the above-mentioned directions. Such hot gases which are produced by arc ignition can thus be diverted into an unendangered space, in the present example between the quay wall 22 and the ship (not shown in the drawing). It is to be noted that in this example the ship is spaced from the quay wall 22 by way of buffers (not shown in the drawing) to such a distance that the carriage or slide 2 and the guide device thereof are not contacted by the ship.

The supplier-side power supply line 6 is laid in the region between the stationary supplier and the carriage or slide 2 in an energy guide chain 23 which has a first connection arranged stationarily relative to the supplier (not shown in the drawing) and a second connection 24 arranged at the carriage or slide 2 and from which the power supply line 6 is passed towards the pivotable arm 3 by way of at least one cable passage 25. The energy guide chain 23 has a lower run 26 connected to the first connection and an upper run 27 connected to the second connection 24, the runs being connected together by way of a direction-changing region. The energy guide chain 23 is arranged in a guide channel 28 which also guides the carriage or slide 2 connected to the second connection 24, on rollers, along the path of travel of the carriage or slide. The guide channel is arranged stationarily on brackets 30 at the quay wall 22.

By virtue of the guide channel 28 which is laterally fixed to the quay wall 22 and has the carriage or slide 2 arranged thereon, the pivot axis of the arm 3 is relatively low in relation to the base surface 31 of the quay so that, in its second substantially horizontal position, the arm 3 with the plug part 4 is easily accessible for an operator on the quay. In the second position 8 of the arm 3 the flap 13 is supported with one or more support elements 32 on the base surface 31 of the quay. The plug part 4 can be connected to the consumer-side power supply line 5 by the operator and the connection can be locked by a locking mechanism 33. The consumer-side power supply line 5 can equally be released from the plug part 4 after conclusion of the power supply to the consumer in the second position 8 of the arm 3 by releasing the locking mechanism.

In addition provided on the arm 3 and the flap 13 is a locking device (not shown in the drawing), with which the flap 13 can be locked in the first position 7 of the arm 3 to the arm so that, in the event of an arc explosion between the plug part 4 and the consumer-side power supply line 5 connected to the plug part 4, the flap cannot be pivoted open by the pressure of the explosion.

LIST OF REFERENCES

1 device
2 slide 3 arm
4 plug part
5 power supply line
6 power supply line
7 first position
8 second position
9 cover part
10 hydraulic drive
11 cover
12 leg
13 flap
14 wall
15 side surface
16 side surface
17 lever mechanism
18 link rod
19 lever arm
20 cable passage
21 housing
22 quay wall
23 energy guide chain
24 second connection
25 cable passage
26 lower run
27 upper run
28 guide channel
30 bracket
31 base surface
32 support element
33 locking mechanism

The invention claimed is:

1. A device (1) for supplying a ship, a position of which initially cannot be exactly determined but which can later be substantially stationarily fixed at a quay of a ship berthing dock, with electrical power from a stationary power supply, the device comprising:
a displaceable carriage or slide (2);
an arm (3) connected to the carriage or slide (2), wherein the arm (3) is moveable between a first position (7) and a second position (8) and includes at least one plug connector part (4) for connection to a first power supply line (5) of the ship, wherein the plug connector part (4) is connectable to the power supply by way of a second power supply line (6); and
a housing (21) arranged on the arm (3), in a region of a free end of the arm (3), wherein the power supply-side second power supply line (6) is passed into the housing (21) and is guided to the plug connector part (4), which is arranged to be projecting from the housing (21), wherein in the first position (7) of the arm (3), the housing (21) with the plug connector part (4) is arranged higher than in the second position of the arm (3), and
wherein in the second position of the arm (3), the housing (21) with the plug connector part (4) is arranged such that the plug connector part (4) is easily accessible to an operator located on the quay of the ship berthing dock.

2. The device (1) according to claim 1, wherein the at least one power supply-side second power supply line (6) in a region between the stationary power supply and the carriage or slide (2) is guided in at least one energy guide chain (23) which has a first connection arranged stationarily relative to the power supply and a second connection (24) arranged at the carriage or slide (2).

3. The device according to claim 1, further comprising a cover part (9) arranged on the arm (3), which in the first position (7) of the arm (3) at least partially covers the plug connector part (4) and in the second position (8) of the arm (3) exposes the plug connector part (4) for connection to the ship-side first power supply line (5).

4. The device (1) according to claim 3, wherein the cover part (9) in the first position (7) of the arm (3) terminates with the housing (21) at at least three sides, including a side directed away from the ship, a side facing in the direction of a path of travel of the carriage or slide (2), and a side facing away from the carriage or slide (2).

5. The device (1) according to claim 3, wherein
the cover part (9) has a wall (14) facing a first direction and side walls (15, 16) which laterally adjoin the wall (14) and which face in a second direction transverse to the first direction, the wall (14) and the side walls (15, 16) covering the plug connector part (4) in the first position (7) of the arm (3); and/or
the cover part (9) is in the form of a flap (13), and the flap (13) is pivotable on the arm (3) about an axis parallel to the pivot axis of the arm.

6. The device (1) according to claim 5, wherein the cover part (9) can be locked and unlocked in the first position (7) of the arm (3).

7. The device (1) according to claim 5, wherein the cover part (9) is a flap (13) and is mounted pivotably to the housing (21).

8. The device (1) according to claim 1, wherein the arm (3) is pivotable between the first position (7) and the second position (8).

9. The device (1) according to claim 8, wherein the arm (3) is pivotable about an axis which extends horizontally and/or parallel to a path of travel of the carriage or slide (2).

10. The device (1) according to claim 8, wherein arranged on the arm (3) is a cable passage (20) which extends along the arm (3) and in which the at least one power supply-side second power supply line (6) is arranged in a region of the arm (3), wherein the cable passage (20) is of a flexurally flexible configuration in the pivotal direction at least in a region of the pivotal connection of the arm (3) to the carriage or slide (2).

11. A device (1) for supplying a ship, a position of which initially cannot be exactly determined but which can later be substantially stationarily fixed at a quay of a ship berthing dock, with electrical power from a stationary power supply, the device comprising a displaceable carriage or slide (2) including an arm (3), and
wherein the arm (3) is moveable between a first position (7) and a second position (8) and includes at least one plug connector part (4) for connection to a first power supply line (5) of the ship,
wherein the plug connector part (4) is connectable to the stationary power supply by way of a second power supply line (6),
wherein the arm (3) is arranged at the displaceable carriage or slide (2) pivotably between the first position (7) and the second position (8), and
wherein the displaceable carriage or slide (2) is guided at a guide device, the guide device being mountable at the quay of the ship berthing dock.

12. The device (1) according to claim 11, wherein
the arm (3) in its second position (8) is so arranged that the plug connector part (4) is easily accessible to an operator disposed on a stationary base surface (31) relative to which the carriage or slide (2) is displaceable; and/or
the arm (3) is pivotable about an axis which extends horizontally and/or parallel to a path of travel of the carriage or slide (2).

13. The device (1) according to claim 11, wherein the guide device, at which the displaceable carriage or slide (2) is guided, is mounted at a ship side to the quay.

14. The device (1) according to claim 11, wherein a housing (21) is arranged on the arm (3) in a region of a free end of the arm (3), wherein the power supply-side second power supply line (6) is passed into the housing (21) and is guided to the plug connector part (4), which is arranged to be projecting from the housing (21).

15. The device (1) according to claim 14, wherein a cover part (9) is a flap (13) mounted pivotably to the housing (21), wherein the cover part (9) in the first position (7) of the arm (3) at least partially covers the plug connector part (4) and the cover part (9) in the second position (8) of the arm (3) exposes the plug connector part (4) for connection to the ship-side first power supply line (5).

16. The device (1) according to claim 15, wherein the cover part (9) includes a wall (14) facing a first direction and side walls (15, 16) which laterally adjoin the wall (14) and which face in a second direction transverse to the first direction, the wall (14) and the side walls (15, 16) covering the plug connector part (4) in the first position (7) of the arm (3).

17. The device (1) according to claim 16, wherein the cover part (9) can be locked and unlocked in the first position (7) of the arm (3).

18. The device (1) according to claim 11, wherein
arranged on the arm (3) is a cable passage (20) which extends along the arm (3) and in which the at least one power supply-side second power supply line (6) is arranged in a region of the arm (3), wherein the cable passage (20) is of a flexurally flexible configuration in the pivotal direction at least in a region of a pivotal connection of the arm (3) to the carriage or slide (2); and/or the at least one power supply-side second power supply line (6) in a region between the stationary power supply and the carriage or slide (2) is guided in at least one energy guide chain (23) which has a first connection arranged stationarily relative to the power supply and a second connection (24) arranged at the carriage or slide (2).

19. The device (1) according to claim 18, wherein the energy guide chain (23) is arranged in a guide channel (28), wherein the guide channel (28) serves as the guide device for guiding the carriage or slide (2).

\* \* \* \* \*